United States Patent [19]

Frandsen

[11] 3,998,024
[45] Dec. 21, 1976

[54] DOUBLE-SKIN INSULATED BUILDING PANEL

[75] Inventor: LeRoy Frandsen, San Marino, Calif.

[73] Assignee: H. H. Robertson Company, Pittsburgh, Pa.

[22] Filed: Aug. 4, 1975

[21] Appl. No.: 601,296

[52] U.S. Cl. .................... 52/595; 52/393; 52/403; 52/404; 52/618; 52/619; 428/73; 428/117

[51] Int. Cl.$^2$ ..................... E04C 2/36

[58] Field of Search ......... 52/309, 403, 595, 394, 52/615, 618, 619; 428/73, 117

[56] References Cited

UNITED STATES PATENTS

| | | | |
|---|---|---|---|
| 2,327,265 | 8/1943 | Herr | 428/119 X |
| 2,839,442 | 6/1958 | Whitaker | 428/73 X |
| 2,849,758 | 9/1958 | Plumley et al. | 52/595 X |
| 2,893,076 | 7/1959 | Herts | 428/73 |
| 2,911,066 | 11/1959 | Saunders et al. | 428/117 |
| 3,196,494 | 7/1965 | Hartman et al. | 52/615 X |
| 3,255,062 | 6/1966 | Wilkins | 264/86 X |
| 3,267,626 | 8/1966 | Daly | 52/619 X |
| 3,564,800 | 2/1971 | Armitage | 52/394 |
| 3,731,441 | 5/1973 | Dixon | 52/394 X |
| 3,777,430 | 12/1973 | Tischuk | 52/595 X |

FOREIGN PATENTS OR APPLICATIONS

| | | | |
|---|---|---|---|
| 364,604 | 11/1962 | Switzerland | 52/615 |
| 1,066,229 | 4/1967 | United Kingdom | 52/615 |

Primary Examiner—Alfred C. Perham
Attorney, Agent, or Firm—Harry B. Keck; George E. Manias

[57] ABSTRACT

A double-skin building panel having an insulating core and having an outer facing sheet laterally offset from and spaced-apart from an inner facing sheet — each panel presenting an overlapping edge portion along one longitudinal side and an overlapped edge portion along its opposite longitudinal side. The panels are adapted to be erected in lapped relation without externally visible fasteners. The insulating core comprises a honeycomb core member filling a major portion of the space between the facing sheets, and rigid spacing means, one positioned along each side of the panel and thermally insulating the facing sheets from each other. The honeycomb core member presents open ended cells which are substantially entirely filled with an insulating medium, for example, expanded silicate.

7 Claims, 9 Drawing Figures

U.S. Patent  Dec. 21, 1976  Sheet 1 of 2  3,998,024
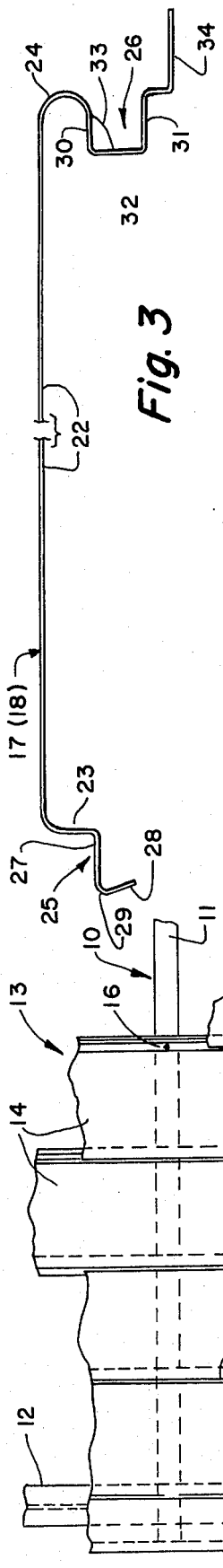
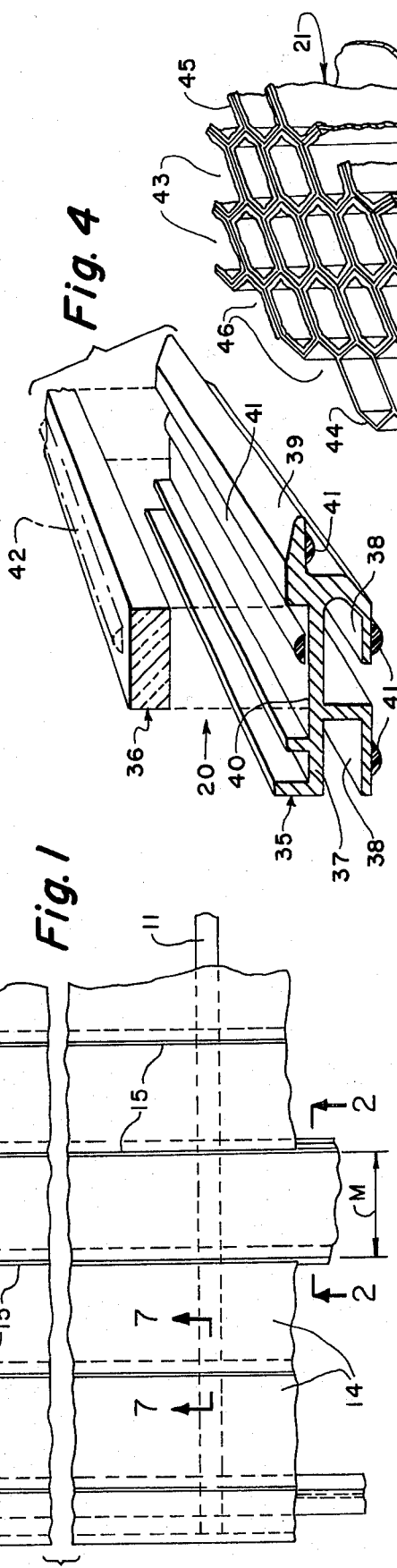
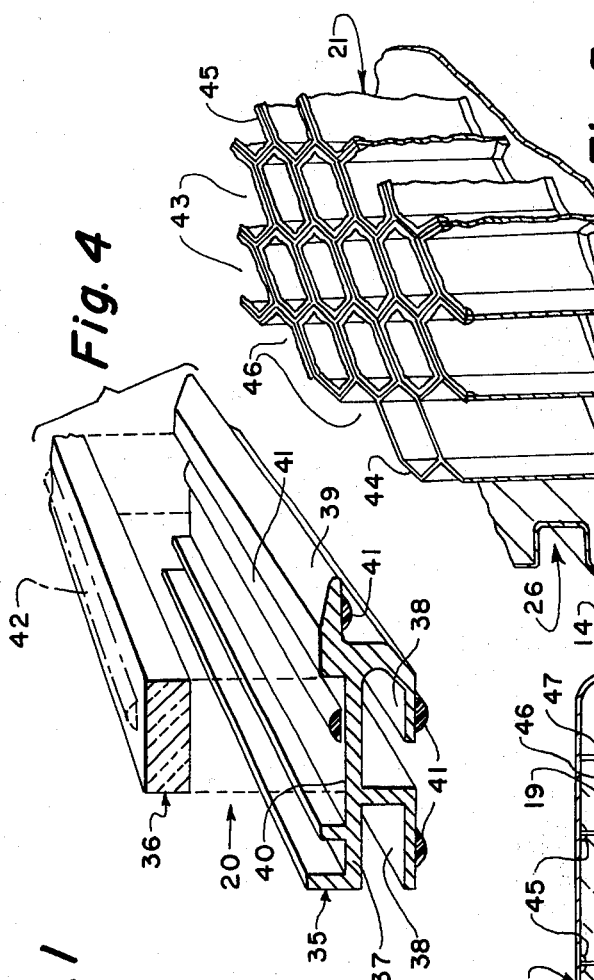
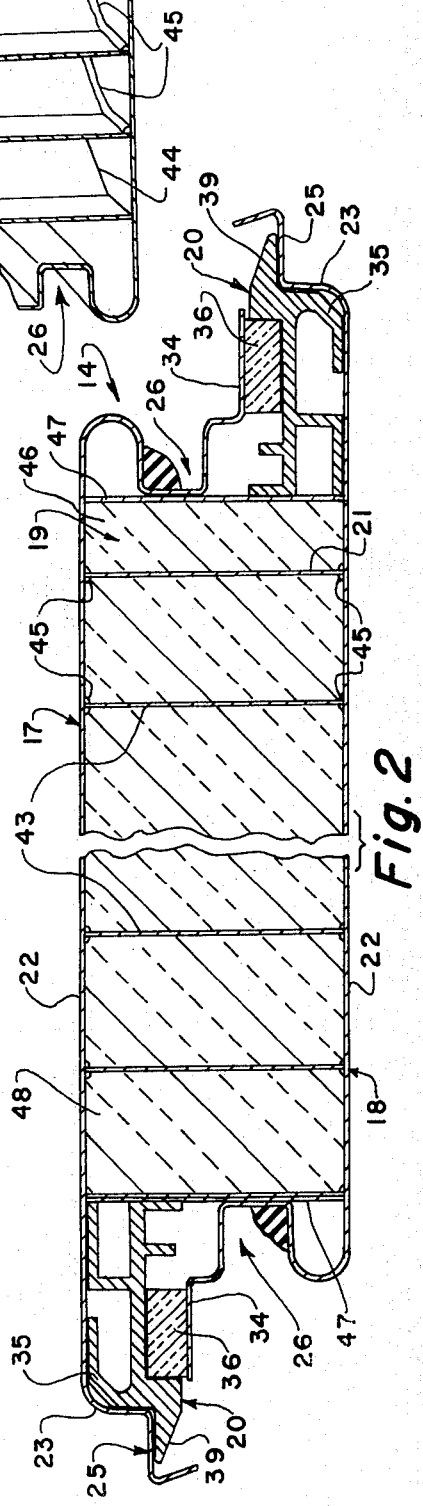

DOUBLE-SKIN INSULATED BUILDING PANEL

BACKGROUND OF THE INVENTION

1. Field of the Invention

This invention relates to building construction panels, and more particularly to double-skin building panels of the type having, as an insulating core, a honeycomb core member and rigid spacing means along each side of the panel thermally insulating the facing sheets from each other.

2. Description of the Prior Art

Panels which are useful as building elements and which incorporate a honeycomb core or like structure are known in the art. See for example U.S. Pat. Nos. 2,327,265 HERR; 2,839,442 WHITAKER; 2,849,758 PLUMLEY et al; 2,893,076 HERTS; 2,911,076 SAUNDERS et al; 3,255,062 WILKENS; 3,868,279 JAMISON et al.

SUMMARY OF THE INVENTION

The principal object of this invention is to provide a double-skin insulated building panel incorporating, as an insulating core, rigid spacing means along opposite longitudinal edges of the panel and a honeycomb core member disposed therebetween.

A further object of this invention is to provide a double-skin insulated building panel wherein the honeycomb core member is filled with a granular insulating medium.

Still another object of this invention is to provide a double-skin insulated building panel wherein the rigid spacing means, provided along each of the opposite longitudinal sides of the panel, thermally insulate the two skins one from the other and strengthen the resulting joint between adjacent ones of the building panels.

The present invention provides a building construction panel of the type comprising a pair of facing sheets and an insulating core disposed therebetween. Each of the facing sheets includes a central web having first and second side walls extending in the same direction from opposite side edges of the central web. A tongue formed in the first side wall extends laterally therefrom away from the central web. A complementary groove formed in the second side wall extends inwardly therefrom. The second side wall further presents a flange extending outwardly therefrom generally parallel to the central web. The facing sheets are assembled such that the flange of each facing sheet confronts the opposing central web of the other facing sheet and is laterally offset and spaced apart from the first side wall of the other facing sheet.

The insulating core of the present building construction panel comprises an expanded honeycomb core member disposed between and adhesively secured to the central webs of the facing sheets. The honeycomb core extends transversely between the complementray grooves of the facing sheets. The insulating core further comprises rigid spacing means, one positioned along each side of the panel between the flange and the central web, by which the facing sheets are maintained spaced-apart and thermally insulated from each other. Each spacing means preferably comprises a rigid longitudinal rail secured to the flange of one facing sheet and to the central web of the other facing sheet. Each rail includes an arm extending interiorly of the tongue for reinforcing the same.

Further in accordance with the present invention, the expanded honeycomb core has plural open ended cells which are capped by the facing sheets. An insulating medium, such as expanded silicate, substantially entirely fills the cells.

The honeycomb, as positioned in the present building panel, presents partial cells along the opposite longitudinal sides thereof. Longitudinal filler sheets are provided, one disposed on each side of the honeycomb in capping relation with the partial cells, thereby to retain the insulation medium within the partial cells.

BRIEF DESCRIPTION OF THE DRAWINGS

FIG. 1 is a fragmentary elevation view of the present building panels erected on a building structural framework;

FIG. 2 is a cross-sectional view taken along the line 2—2 of FIG. 1, illustrating the transverse profile of the present building construction panel;

FIG. 3 is an end view illustrating the profile of the facing sheets used in the building panel of FIG. 2;

FIG. 4 is an exploded perspective view of rigid spacing means incorporated in the panel of FIG. 2;

FIG. 5 is a fragmentary isometric view of the honeycomb core member secured to a facing sheet;

DESCRIPTION OF THE PREFERRED EMBODIMENTS

Figure 6:
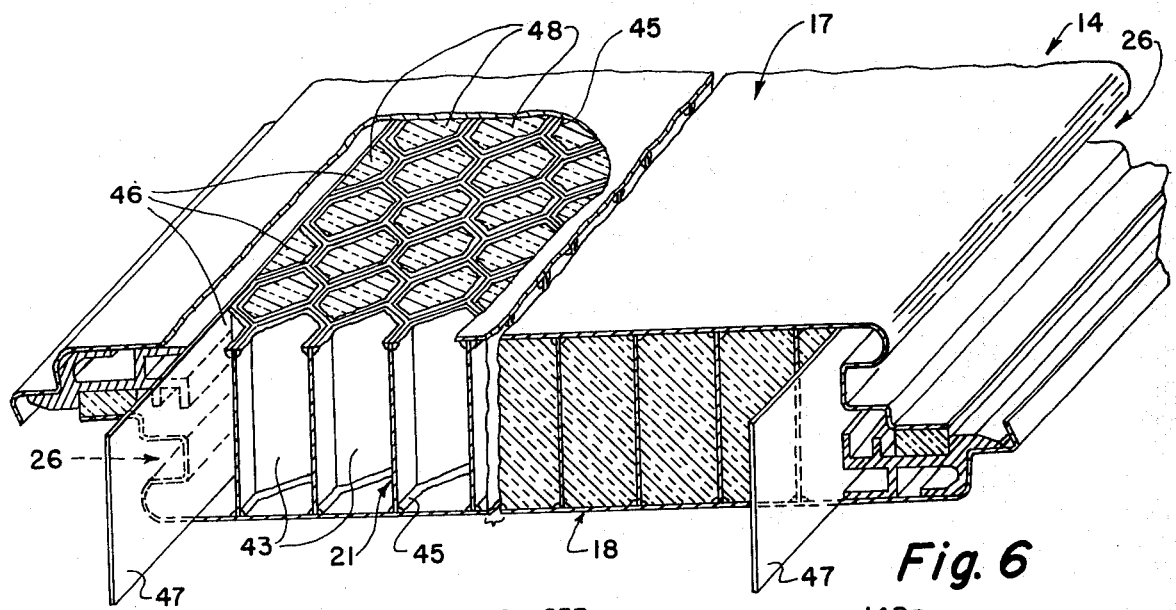
FIG. 6 is a broken, fragmentary isometric view of the panel of FIG. 2.

FIG. 1 illustrates a building structural framework 10 of which only vertically spaced horizontal subgirts 11 and a vertical column 12 are illustrated. The building structural framework 10 supports a wall structure 13 assembled from plural building panels 14 erected in edge overlapped relation and presenting plural joints 15. Each of the panels 14 is secured to selected ones of the subgirts 11 by fasteners 16 (only one is visible in FIG. 1).

Each of the panels 14 (FIG. 2) comprises an outer facing sheet 17, an inner facing sheet 18, and an insulating core 19 disposed between and secured to the facing sheets 17, 18. The insulating core 19 comprises rigid spacing means 20, one positioned along each longitudinal side of the panel 14, and a honeycomb core member 21.

The facing sheets 17, 18 may be formed from steel, anodized aluminum, stainless steel, weathering steel and the like in thicknesses from 20 gauge (0.81 mm) to 24 gauge (0.61 mm). Each of the facing sheets 17, 18 (FIG. 3) includes a central web 22 having first and second side walls 23, 24 extending in the same direction from opposite longitudinal edges thereof. A tongue 25 is formed along the first side wall 23 and extends laterally therefrom away from the central web 22. A complementary groove 26 is formed in the second side wall 24 and extends inwardly therefrom and confronts the central web 22.

The tongue 25 includes first and second wall segments 27, 28. The first wall segment adjoins the first side wall 23 and extends outwardly therefrom generally parallel with the central web 22. The second wall segment 28 adjoins the first wall segment 27 to provide a leading edge 29 remote from the first side wall 23. The second wall segment 28 extends away from the central web 22 and is inclined relative to the first wall segment 27 so as to form an acute angle therewith. The recess 26 comprises spaced-apart wall segments 30, 31 which are generally parallel to each other and to the central web 22; and a connecting wall segment 32. A bead 33 of sealant material is provided along substantially the entire length of the groove 26. Each facing sheet 17 (18) additionally presents a flange 34 which adjoins the second side wall 24 at a location remote from the central web 22 and which extends outwardly from the second side wall 24 generally parallel to the central web 22.

It will be observed in FIG. 2 that the facing sheets 17, 18 are laterally offset from one another, the overall arrangement being such that the flange 34 of each facing sheet 17 (18) confronts the opposing central web 22 of the other facing sheet 18 (17) and is laterally spaced-apart from the first side wall 23 of the other facing sheet 18 (17).

Each rigid spacing means 20 (FIG. 4) may comprise a profiled metal element 35 and an isolation strip 36. The metal element 35 which is extruded preferably from aluminum, includes a central plate 37 from which extend a pair of legs 38 and an arm 39. The metal element 35 additionally presents a recess 40 for receiving the isolation strip 36. Each of the legs 38 may be provided with a bead 41 of adhesive material for securing each of the metal elements 35 on the facing sheets 17, 18 in the position illustrated in FIG. 2. The adhesive material 41 may comprise any of the well-known urethane adhesives, epoxy structural adhesives, and the like.

The isolation strip 36 may be formed from any suitable rigid thermal insulating material, such as glass fiber reinforced gypsum, cement asbestos board, and the like. An additional bead 41 of adhesive material, provided for example in the recess 40, secures the isolation strip 36 to the metal element 35. Alternatively, the isolation strip may comprise cast-in-place gypsum. In either instance, the isolation strip 36 receives a bead 42 of adhesive material, shown in dash-dot outline in FIG. 4, by which each of the rigid spacing means 20 is secured to the flange 34 of the facing sheets 17, 18. It will be observed in FIG. 2 that the arm 39 of each metal element 35 extends interiorly of the tongue 25 thereby strengthening the same.

The honeycomb core member 21 (FIG. 5) presents plural open-ended cells 43 having upper and lower faying edges 44 each provided with a bead 45 of adhesive material, such as an epoxy structural adhesive. The honeycomb core member 21 (FIGS. 2 and 6) extends transversely between the complementary grooves 26 and the rigid spacing means 20 — the open ended cells 43 thereof being capped by the facing sheets 17, 18. The honeycomb core member 21 is secured to the facing sheets 17, 18 by the beads 45 of adhesive material.

The honeycomb member 21 may be made from Kraft paper impregnated with a fire resistant salt and with a phenolic resin — the impregnants rendering the honeycomb core member fire, moisture and fungus resistant.

Paper honeycomb core members useful in the panel of this invention have a depth of up to 3 inches (26.2 mm) and have cell sizes of ¾ inch (19 mm) to 1 inch (25.4 mm). Alternatively, the honeycomb core member 21 instead may be formed from metals such as aluminum of 0.003 inch (0.76 mm) thickness having a depth of up to 3 inches (76.2 mm) and cell sizes of ¼ inch (6.4 mm) to 3.4 inches (19 mm).

It will be observed in FIGS. 2, 5 and 6 that the opposite longitudinal edge sides of the honeycomb core member 21 present partial or half cells 46 confronting the complementary grooves 26. As illustrated in FIGS. 2 and 6, a longitudinal filler strip 47 is provided between each longitudinal side of the honeycomb core member 21 and the adjacent complementary groove 26. The longitudinal filler sheets 47 serve as sides which render the half cells 46 capable of holding an insulation medium 48. The insulating medium 48 substantially entirely fills the open-ended cells 43 and the half cells 46. The insulation medium 48 may comprise an expanded silicate, such as perlite, or other thermal insulating material, any one of which increases the heat-insulating properties of the panel 14.

Figure 7:
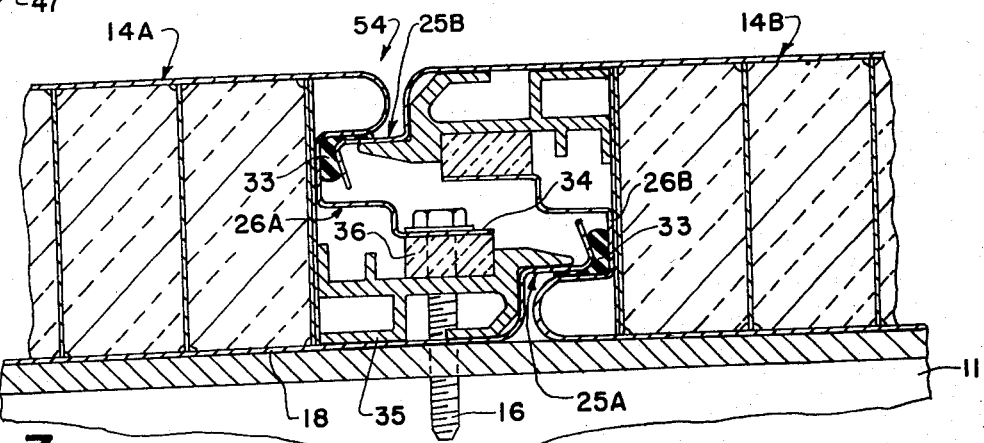
FIG. 7 is a fragmentary cross-sectional view taken along the line 7—7 of FIG. 1 illustrating the joint between adjacent ones of the building panels of this invention.

FIG. 7 illustrates a joint 54 between adjacent panels 14A, 14B. The panel 14A is secured to the subgirt 11 by the fastener 16 which extends through the flange 34, the isolation strip 36, the metal element 35, the facing sheet 18, into threaded engagement with the subgirt 11. With the panel 14A thus secured to the subgirt 11, the building panel 14B is erected by introducing the tongue 25B thereof into the complementary groove 26A of the panel 14A. Simultaneously, the tongue 25A of the panel 14A is received in the complementary groove 26B of the panel 14B. The tongues 25A, 25B penetrate the sealant bead 33 presented in each groove 26A, 26B thereby to provide weather-tight seals.

Reverting to FIG. 1, each of the panels 14 has a modular width indicated at M, which corresponds to the distance between the first and second side walls 23, 25 (FIG. 5). Panels 14 may be provided having modular widths M ranging from 12 inches (305 mm) to 60 inches (1524 mm).

Figure 8:
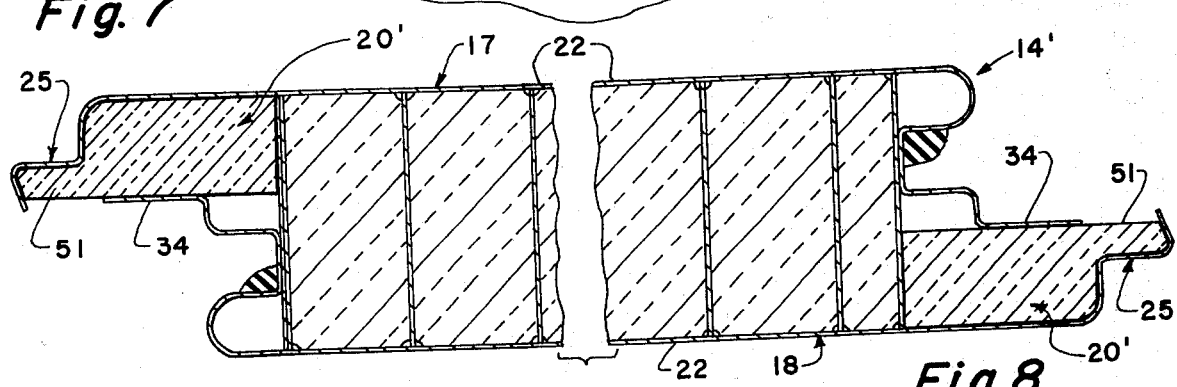
FIG. 8 is a cross-sectional view, similar to FIG. 2, illustrating an alternative embodiment of the present building panel.
Figure 9:
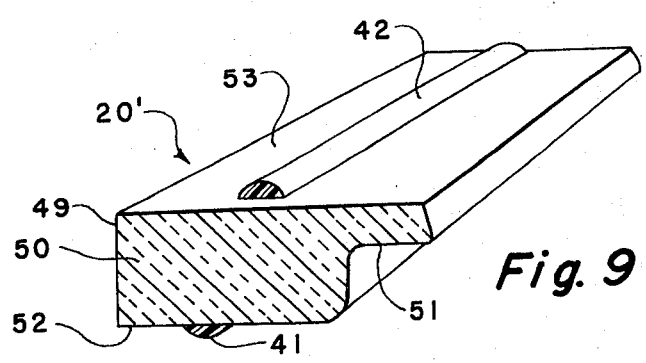
FIG. 9 is a fragmentary perspective view of alternative rigid spacing means utilized in the panel of FIG. 8.

An alternative embodiment of the present building panel is illustrated in FIGS. 8 and 9. Corresponding numerals will be employed to identify corresponding parts heretofore described.

FIG. 8 illustrates a building panel 14' incorporating rigid spacing means 20' along each longitudinal side thereof. The rigid spacing means 20' (FIG. 9) may comprise a rigid longitudinal rail 49 of thermal insulating material, such as, pre-cast glass fiber reinforced gypsum, cement asbestos board, and the like. The rail 49 includes a generally rectangular body portion 50 having an arm 51 extending from one side thereof. One or more beads 41 of adhesive are applied to the lower face 52 of the body portion 50 for securing each of the rails 49 to the web 22 of the facing sheets 17, 18 in the position illustrated in FIG. 8. The rail 49 (FIG. 9) may also be provided with a second bead 42 on the opposite face 53 of the body portion 50 for securing each of the rails 49 to the flange 34 (FIG. 8) of the facing sheets 17, 18. It will be observed in FIG. 8 that the arm 51 of each of the rigid spacing means 20' extends interiorly of the tongue 25 thereby strengthening the same.

The building panel 14' is erected in the same manner as the building panel 14 (FIG. 2) to provide a joint similar to that shown in FIG. 7.

I claim:

1. A building construction panel of the type comprising a pair of facing sheets and an insulating core disposed therebetween,
   each facing sheet including
      a central web,
      first and second side walls extending in the same direction from opposite side edges of the central web,
      a tongue formed in the first side wall and extending laterally therefrom away from said central web,
      a complementary groove formed in the second side wall and extending inwardly therefrom, and
      a flange extending outwardly from the second side wall generally parallel to the central web,
   the facing sheets being assembled with the flange of each facing sheet confronting the opposing central web of the other facing sheet and being laterally spaced-apart from the first side wall of the other facing sheet; and
   said insulating core comprising
      an expanded honeycomb core member disposed between and secured to the central webs of the facing sheets and extending transversely between the complementary grooves of said facing sheets; and
      rigid spacing means, one positioned along each side of said panel between the flange and the central web, and thermally insulating said facing sheets from each other, each said spacing means comprising a rigid longitudinal rail secured to the flange of one facing sheet and to the central web of the other facing sheet, each said rail including an arm extending interiorly of said tongue.

2. The panel of claim 1 wherein
   each said rail extends transversely between said first side wall and said honeycomb member.

3. The panel of claim 1 wherein each said rail is formed from glass fiber reinforced gypsum.

4. The panel of claim 1 wherein each said rail is formed of cement asbestos board.

5. The panel of claim 1 wherein said expended honeycomb core presents plural open-ended cells capped by said facing sheets, and including
   insulating material substantially entirely filling said cells.

6. The panel of claim 5 wherein said insulating material comprises an expanded silicate.

7. The panel of claim 5 wherein
   the opposite longitudinal sides of said honeycomb core member present partial cells, and including
   longitudinal filler sheets, one disposed on each side of said honeycomb core in capping relation with said partial cells.

* * * * *